(12) United States Patent
Muff et al.

(10) Patent No.: US 8,356,162 B2
(45) Date of Patent: Jan. 15, 2013

(54) EXECUTION UNIT WITH DATA DEPENDENT CONDITIONAL WRITE INSTRUCTIONS

(75) Inventors: Adam James Muff, Rochester, MN (US); Matthew Ray Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 12/050,721

(22) Filed: Mar. 18, 2008

(65) Prior Publication Data

US 2009/0240920 A1    Sep. 24, 2009

(51) Int. Cl.
 G06F 7/38     (2006.01)
 G06F 9/00     (2006.01)
 G06F 9/44     (2006.01)

(52) U.S. Cl. ........ 712/220; 712/224; 712/226; 345/422; 345/563

(58) Field of Classification Search .................. 712/224, 712/226; 345/422, 563
 See application file for complete search history.

(56) References Cited

U.S. PATENT DOCUMENTS

| | | | | |
|---|---|---|---|---|
| 4,679,041 A | * | 7/1987 | Fetter et al. .................. | 345/422 |
| 4,970,499 A | * | 11/1990 | Ryherd et al. ................. | 345/422 |
| 5,084,830 A | * | 1/1992 | Doornink et al. ............. | 345/572 |
| 5,418,746 A | * | 5/1995 | Choi ........................ | 365/189.05 |
| 6,366,999 B1 | * | 4/2002 | Drabenstott et al. ............ | 712/24 |
| 6,374,346 B1 | * | 4/2002 | Seshan et al. .................. | 712/221 |
| 7,196,708 B2 | * | 3/2007 | Dorojevets et al. ............ | 345/502 |
| 7,283,417 B2 | * | 10/2007 | Davis et al. ............... | 365/230.03 |
| 7,412,591 B2 | * | 8/2008 | Ma et al. ........................ | 712/229 |
| 2004/0012600 A1 | * | 1/2004 | Deering et al. ................ | 345/506 |

OTHER PUBLICATIONS

Intel Architecture Software Developer's Manual vol. 2: Instruction Set Reference, 1999.*
Martin Milo, "Lab 2—Register File: CSE 372", Apr. 2006.*

* cited by examiner

Primary Examiner — Eric Coleman
(74) Attorney, Agent, or Firm — Wood, Herron & Evans, LLP

(57) ABSTRACT

An execution unit supports data dependent conditional write instructions that write data to a target only when a particular condition is met. In one implementation, a data dependent conditional write instruction identifies a condition as well as data to be tested against that condition. The data is tested against that condition, and the result of the test is used to selectively enable or disable a write to a target associated with the data dependent conditional write instruction. Then, a write is attempted while the write to the target is enabled or disabled such that the write will update the contents of the target only when the write is selectively enabled as a result of the test. By doing so, dependencies are typically avoided, as is use of an architected condition register that might otherwise introduce branch prediction mispredict penalties, enabling improved performance with z-buffer test and similar types of algorithms.

20 Claims, 7 Drawing Sheets

EXECUTION UNIT WITH DATA DEPENDENT CONDITIONAL WRITE INSTRUCTIONS

FIELD OF THE INVENTION

The invention is generally related to data processing, and in particular to processor architectures and execution units incorporated therein.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

One area where parallelism continues to be exploited is in the area of execution units, e.g., fixed point or floating point execution units. Many floating point execution units, for example, are deeply pipelined. However, while pipelining can improve performance, pipelining is most efficient when the instructions processed by a pipeline are not dependent on one another, e.g., where a later instruction does not use the result of an earlier instruction. Whenever an instruction operates on the result of another instruction, typically the later instruction cannot enter the pipeline until the earlier instruction has exited the pipeline and calculated its result. The later instruction is said to be dependent on the earlier instruction, and phenomenon of stalling the later instruction waiting for the result of an earlier instruction is said to introduce "bubbles," or cycles where no productive operations are being performed, into the pipeline.

One technique that may be used to extract higher utilization from a pipelined execution unit and remove unused bubbles is to introduce multithreading. In this way, other threads are able to issue instructions into the unused slots in the pipeline, which drives the utilization and hence the aggregate throughput up. Another popular technique for increasing performance is to use a single instruction multiple data (SIMD) architecture, which is also referred to as 'vectorizing' the data. In this manner, operations are performed on multiple data elements at the same time, and in response to the same SIMD instruction. A vector execution unit typically includes multiple processing lanes that handle different datapoints in a vector and perform similar operations on all of the datapoints at the same time. For example, for an architecture that relies on quad(4)word vectors, a vector execution unit may include four processing lanes that perform the identical operations on the four words in each vector. The aforementioned techniques may also be combined, resulting in a multithreaded vector execution unit architecture that enables multiple threads to issue SIMD instructions to a vector execution unit to process "vectors" of datapoints at the same time.

Vector-based floating point execution units, in particular, are optimally configured for many image processing applications, as many of the floating point arithmetic operations performed in image processing may be performed on multiple datapoints at a time, e.g., on each coordinate of a vertex from a graphical primitive. As a result, from both a performance and a logical standpoint, it is often beneficial to use vectors to store and manipulate various types of image-related data.

Despite the performance improvements that can be obtained in vector-based floating point execution units, however, such execution units are not always optimally configured for certain types of algorithms. Floating point algorithms that rely on loops, or that otherwise require conditional branches and decision making, for example, may not perform optimally in some conventional hardware designs, particularly designs that incorporate branch prediction. In many conventional hardware designs that rely on branch prediction, a branch prediction unit is tightly coupled with a fixed point execution unit, while the vector floating point execution unit is logically and physically separate therefrom on the chip. Vector compares often require special synchronization with the branch unit, in part due to the fact that the condition register upon which the branch conditions are evaluated is local to the branch unit, which delays processing due to the communication between these distinct units. In addition, branching based on vector compare results can lead to costly branch mispredicts, resulting in comparatively large performance penalties due in part to the need to flush the floating point execution pipeline whenever a branch is mispredicted. In a vector floating point execution unit with a depth of six, for example, a branch mispredict may result in as much as a 20-30 cycle performance penalty.

One example of an image processing algorithm that may perform sub-optimally in some conventional hardware designs is a z-buffer test algorithm. In three-dimensional (3D) graphics applications, great care must be taken to avoid drawing objects that would not be visible, such as when an opaque object is closer to the camera than another object. In such a case, the object closer to the camera would block the farther object, and a 3D application that is attempting to draw this scene must not draw the further object. Often 3D computer graphics rasterization applications will employ what is called a "z-buffer" to handle this case. The z-buffer is a set of values that represent distance from the camera (sometimes called depth) for each pixel. Every time the rasterization algorithm is ready to draw a pixel, it compares the depth of the pixel it is attempting to draw with the depth of the z-buffer for that pixel. If the z-buffer value indicates that the existing pixel is closer to the camera, the new pixel is not drawn and the z-buffer value is not updated. In contrast, if the new pixel to be drawn is closer to the camera, the new pixel is drawn and the z-buffer is updated with the new depth associated with that pixel.

Table I, for example, illustrates exemplary pseudocode suitable for testing the z-buffer in association with drawing a new pixel:

TABLE I

Z-buffer Test Pseudocode

```
if (previous_zval_for_pixel(x,y) > zi)
{
    zbuffer(x,y,zi);
}
```

Typically, implementation of such pseudocode in a conventional processing unit incorporates a comparison of the depth of the current pixel ($zi$) with the value stored in the z-buffer, followed by a conditional branch that skips a subsequent write instruction if the comparison indicates that the new pixel is at a greater depth than that stored in the z-buffer, and is thus occluded by the existing pixel. Branch mispredicts for the conditional branch typically incur substantial performance penalties due to the need to flush the vector floating point execution pipeline, while even in the absence of mispredicts, a performance penalty is typically incurred due to the need for synchronization between the vector floating point execution unit and the branch unit. Considering that this test may be performed millions of times as each new pixel is processed, the overall performance impact can be substantial.

An alternative method for implementing such an algorithm in a processing unit relies on predication, where one instruction sets a predicate register in the vector floating point execution unit, and then a following instruction looks at the predicate register, and takes different actions based on its value. For example, Table II below illustrates an implementation of a z-buffer test routine that uses predication, written in PowerPC VMX assembly code:

TABLE II

Z-buffer Test PowerPC VMX Assembly Code

```
loop:
    lvx      vr1,ra,rb
    vcmpgtfp vr2,vr1,vr0
    vsel     vr3,vr2,vr1,vr0
```

It is assumed that, in this code, vr0 contains the new x,y,zi coordinate under test. The lvx instruction loads the previous z-buffer value for the current (x,y) coordinate, the vcmpgtfp instruction performs a greater than compare between the previous z-buffer value and the current zi coordinate, and sets vr2 to all 1's if true. The vsel instruction then writes either the new zi coordinate or the old z-buffer value to vr3 based upon the comparison.

The use of predication eliminates the need to use the condition register and thus the risk of mispredicts by a decoupled branch unit, but consumes a temporary register in the vector floating point execution unit. In addition, a dependency exists between the vcmpgtfp and vsel instructions, requiring the vsel instruction to be stalled from executing until the result of the compare is complete. Assuming, for example, a vector floating point execution unit pipeline depth of six, the vcmpgtfp and vsel instructions would require 12 cycles to complete. Again considering that this test may be performed millions of times as each new pixel is processed, the overall performance impact of predication due to the introduction of dependencies can be significant.

Therefore, a substantial need continues to exist in the art for a manner of improving the performance of z-buffer test algorithms, as well as other similar algorithms that may otherwise introduce dependencies and/or branch mispredicts in conventional hardware designs.

SUMMARY OF THE INVENTION

The invention addresses these and other problems associated with the prior art by providing an execution unit that supports data dependent conditional write instructions that write data to a target only when a particular condition is met. In one embodiment of the invention, for example, a data dependent conditional write instruction identifies a condition as well as data to be tested against that condition. The data is tested against that condition, and the result of the test is used to selectively enable or disable a write to a target associated with the data dependent conditional write instruction. Then, a write is attempted while the write to the target is enabled or disabled such that the write will update the contents of the target only when the write is selectively enabled as a result of the test. By doing so, dependencies are typically avoided, as is use of an architected condition register that might otherwise introduce branch prediction mispredict penalties, enabling improved performance with z-buffer test and similar types of algorithms.

Consistent with one aspect of the invention, an instruction is executed in an execution unit by, in response to receiving a data dependent conditional write instruction, testing data associated with the data dependent conditional write instruction against a condition associated with the data dependent conditional write instruction, and selectively writing to a target associated with the data dependent conditional write instruction based upon the test.

Consistent with another aspect of the invention, a target is conditionally written in a processing unit of the type including an execution unit with a register file by testing whether a condition is met, selectively enabling or disabling a write to a target in the register file based upon whether the condition is met, and initiating a write to the target while the write is selectively enabled or disabled based upon whether the condition is met such that the target is updated in response to initiating the write only if the write is selective enabled.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
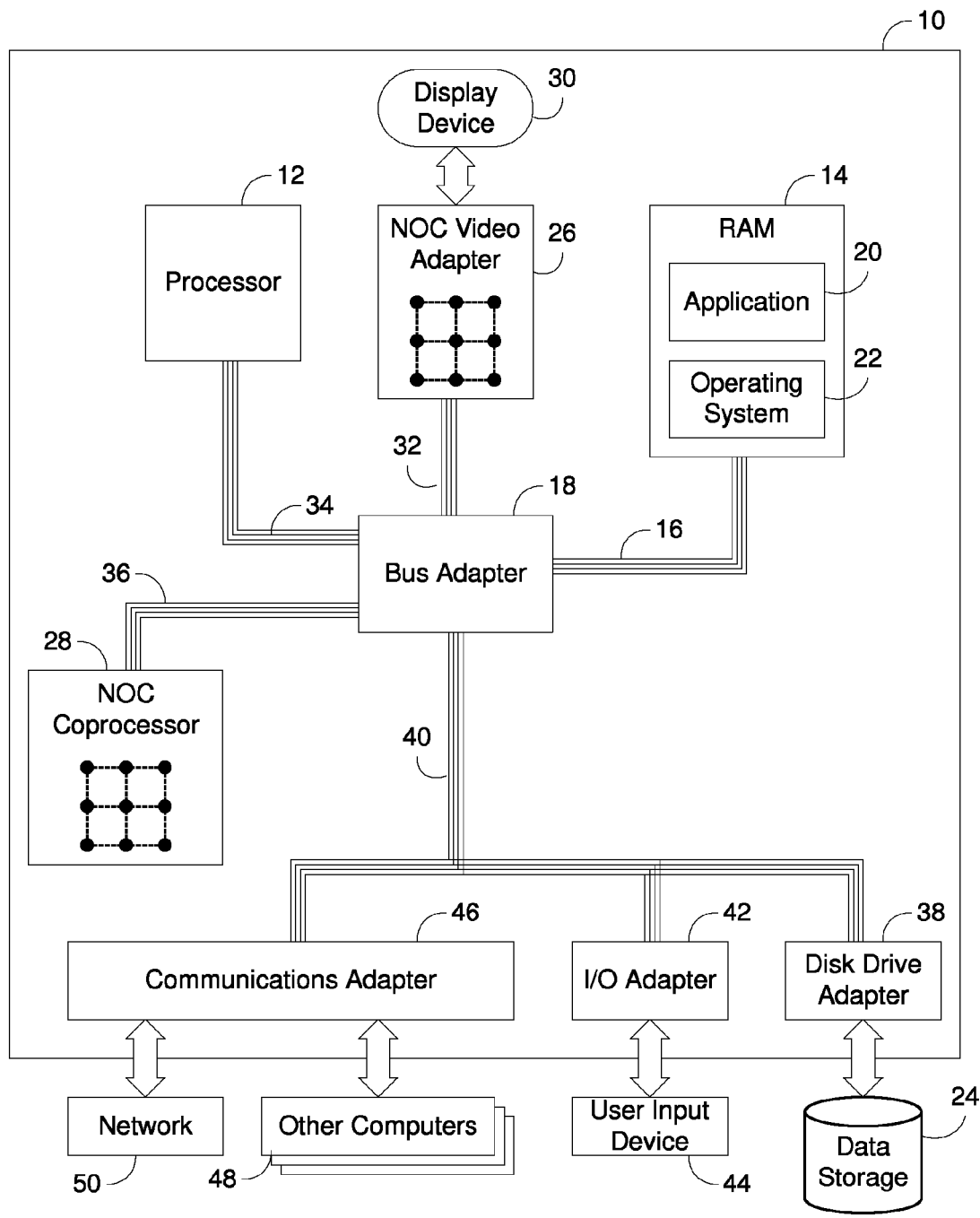
FIG. 1 is a block diagram of exemplary automated computing machinery including an exemplary computer useful in data processing consistent with embodiments of the present invention.

Embodiments consistent with the invention assist in improving the performance of z-buffer test and similar algorithms in an execution unit through the use of data dependent conditional write instructions that conditionally write to targets based upon conditions tested against data associated with such instructions.

A data dependent conditional write instruction consistent with the invention typically is associated with a condition and data to be tested against that condition. The condition may include a comparison with other data, e.g., other data associated with the instruction, or may include another type of condition such as an exception condition. For example, a comparison-type condition may include comparisons such as less than compares, greater than compares, less than or equal compares, greater than or equal compares, equal to compares, not equal to compares, boundary compares, not-a-number (NaN) compares, etc. Exception-type conditions may include conditions such as overflow exceptions, underflow exceptions, inexact exceptions, etc. A condition for an instruction may be associated with that instruction via a dedicated opcode, or may be indicated via an operand, register, flag, indicator, or via indirection, among others.

Data may be associated with an instruction, for example, by being identified in an opcode or via an operand, or by being stored in a register identified by the instruction. Data may also be associated via indirection or indexing, or in other manners of supplying data to an instruction. For example, in one embodiment, a data dependent conditional write instruction may include one or two operands that identify one or two registers within which the data to be tested is stored.

A target of a data dependent conditional write instruction is typically identified via a target register in a register file, e.g., as an operand to the instruction. As with the data to be tested, the target may be identified via other mechanisms in which the target of a write instruction may be identified. In the illustrated embodiments, the location of the target of a data dependent conditional write instruction is gated via a write enable signal such that a write is initiated unconditionally on the target in response to the data dependent conditional write instruction, but the target is actually updated only in response to the tested condition being met. The condition thus acts as a mask on the write operation to essentially null or no-op the data dependent conditional write instruction when the condition is not met.

Embodiments consistent with the invention may be utilized in connection with a wide variety of algorithms without departing from the spirit and scope of the invention. For example, as will be discussed in greater detail below, embodiments of the invention may be used in connection with z-buffer test algorithms that test whether a pixel generated at a particular coordinate in an image should be updated with newly generated data based upon the depth of the pixel data already generated for the image. The invention, however, may find other uses in connection with other types of algorithms that conventionally use conditional branches to control whether or not data is written to a target based on a condition. Other suitable algorithms will be appreciated by one of ordinary skill in the art having the benefit of the instant disclosure.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
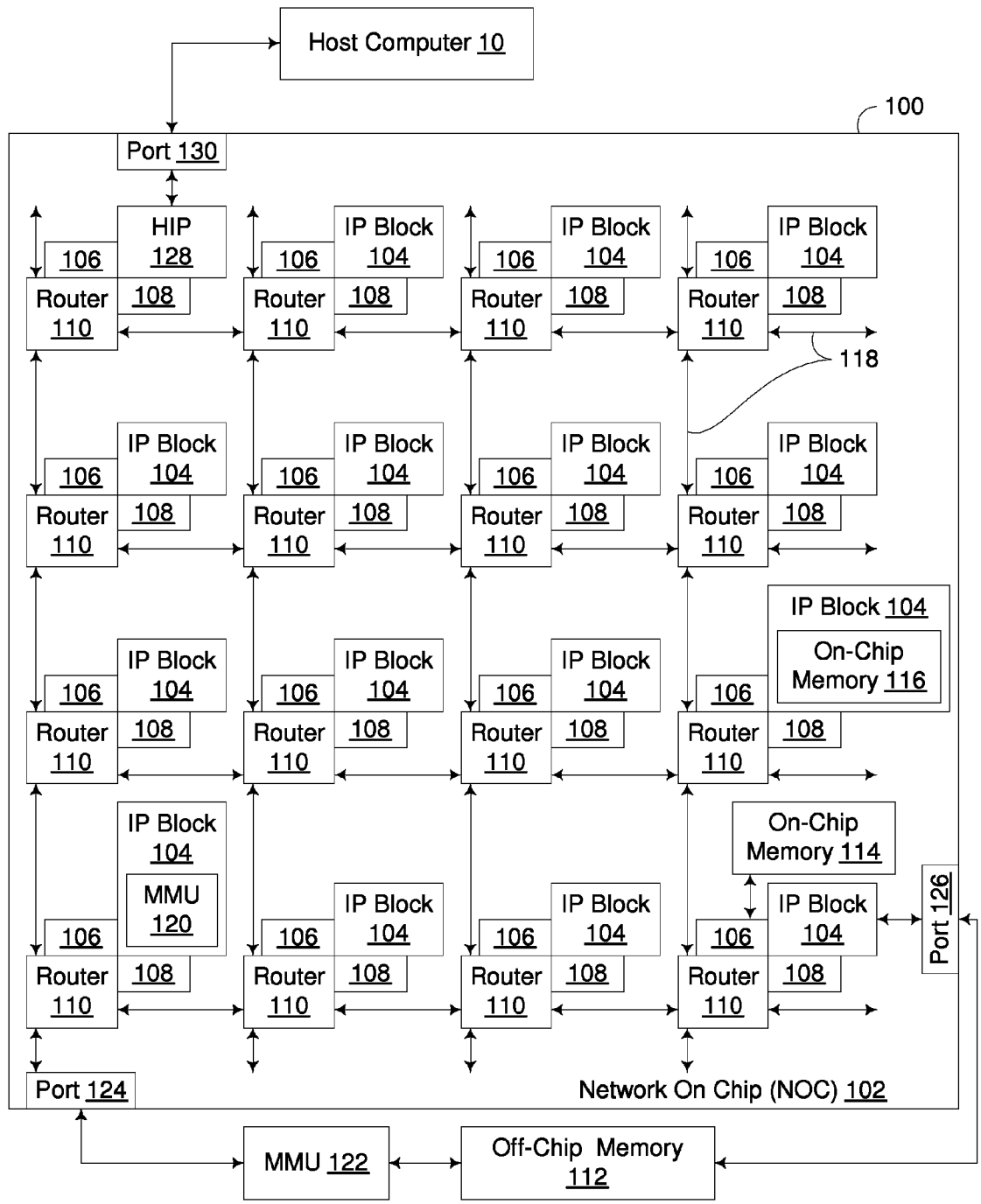
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that if a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
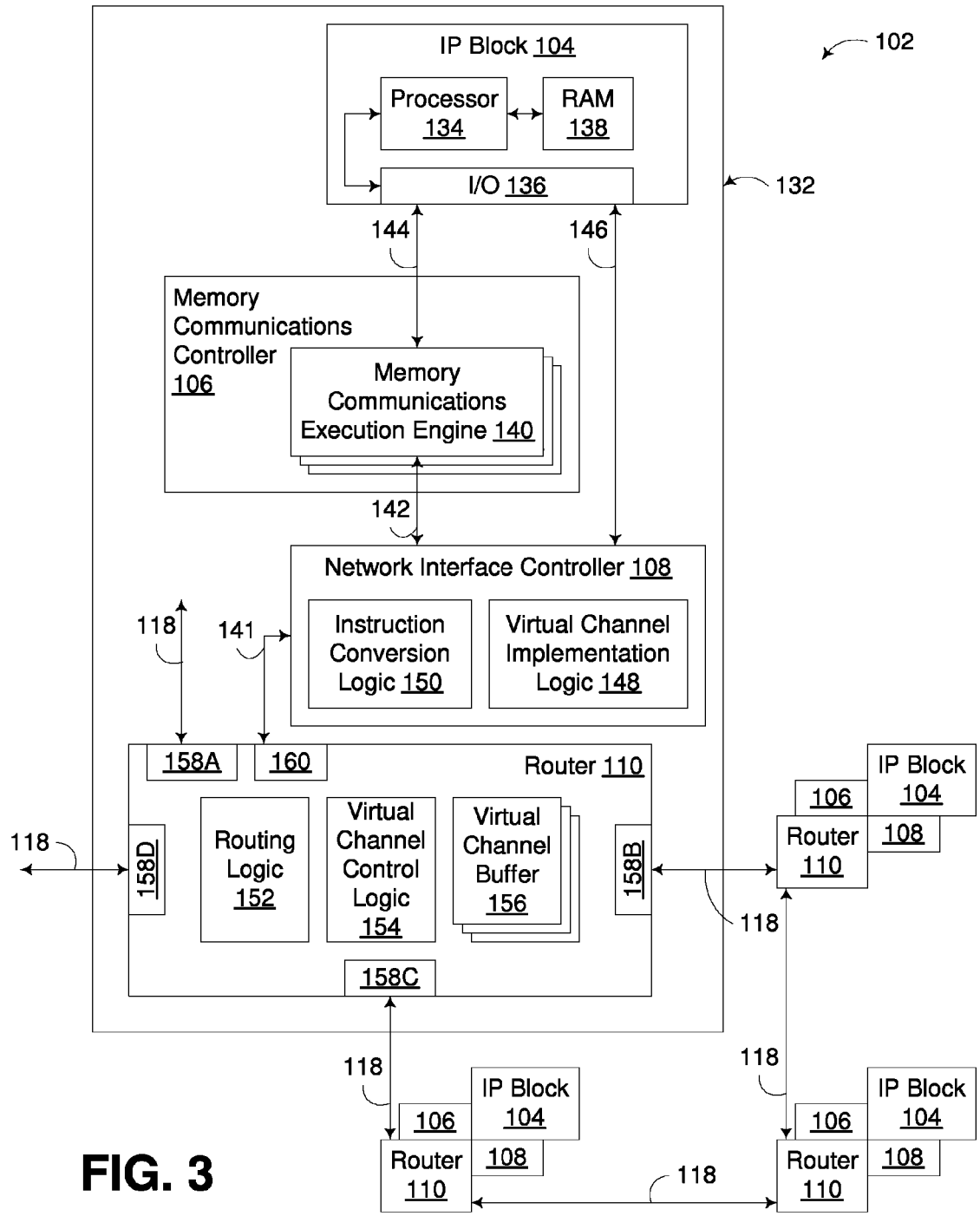
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
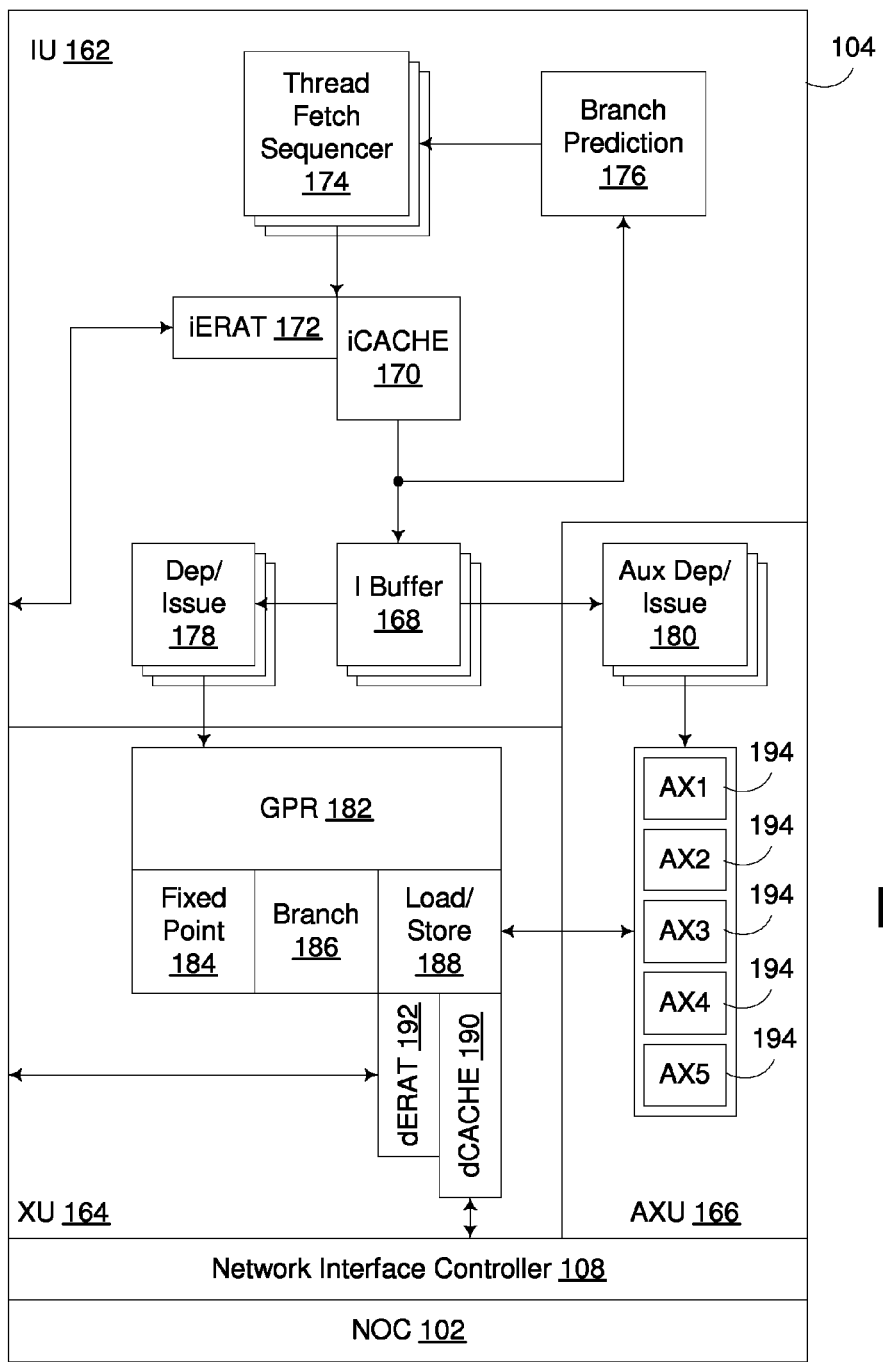
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Execution Unit Supporting Data Dependent Conditional Write Instructions

Figure 5:
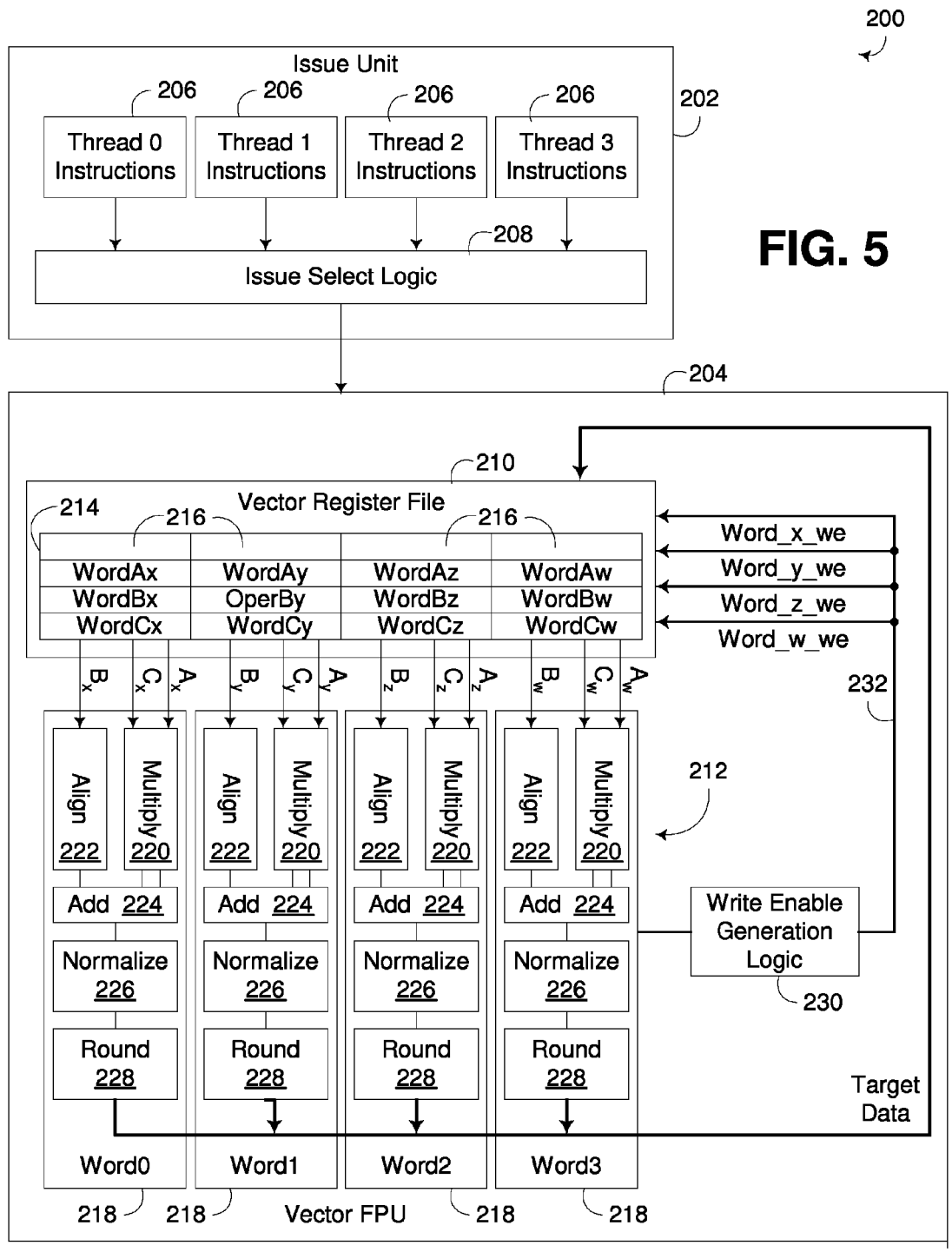
FIG. 5 is a block diagram of a processing unit configured to execute data dependent conditional write instructions consistent with the invention, and capable of being implemented within an IP block from the NOC of FIG. 2.

Turning now to FIG. 5, this figure illustrates an exemplary processing unit 200 incorporating an issue unit 202 and execution unit 204 supporting the use of data dependent conditional write instructions consistent with the invention. Processing unit 200 may be implemented, for example, in an IP block such as an IP block 104 from FIGS. 1-4. In the alternative, processing unit 200 may be implemented in other processor architectures that issue and execute instructions, including single or multi-core microprocessors or microcontrollers.

Issue unit 202 is a multithreaded issue unit capable of receiving instructions from multiple (e.g., four) threads 206. Issue select logic 208 operates to schedule the issuance of instructions by the various threads, and typically includes logic for managing dependencies between instructions (i.e., conditions where a newer instruction must be stalled until the result from an older, executing instruction is ready), in a manner generally understood in the art. Issue select logic 208 outputs instructions to execution unit 204, which causes the execution unit to initiate execution of received instructions. Among the instructions that may be received and issued to execution unit 204 by issue unit 202 are data dependent conditional write instructions consistent with the invention. Issue unit 202 is illustrated in FIG. 5 as a multi-threaded issue unit, although in some implementations, issue unit 202 may be a single threaded issue unit capable of receiving instructions from only a single thread of execution.

Execution unit 204 processes instructions issued to the execution unit by issue unit 202, and includes a register file 210 coupled to a multi-stage execution pipeline 212 capable of processing data stored in register file 210 based upon the instructions issued by issue logic 202, and storing target data back to the register file. Execution unit 202 may be implemented as a number of different types of execution units, e.g., floating point units, fixed point units, or specialized execution units such as graphics processing units, encryption/decryption units, coprocessors, XML processing units, etc., and may be implemented either as a vector or scalar-based unit.

In the implementation illustrated in FIG. 5, for example, multi-stage execution pipeline 212 is implemented as a vector floating point unit, e.g., as might be used for image processing, which processes single instruction multiple data (SIMD) instructions issued to the execution unit by issue logic 202. Register file 210 includes a plurality (e.g., 128) of vector registers 214, each including a plurality (e.g., four) words 216. Execution unit 204 includes a plurality (e.g., four) processing lanes or sub-units 218 capable of processing vectors stored in register file 210 based upon the instructions issued by issue logic 202, and storing target data back to a vector register in register file 210.

Given the configuration of processing unit 200 as a floating point unit usable in image processing applications, each processing lane 218 is configured to process floating point instructions. While a wide variety of other floating point architectures may be used in the alternative, processing unit 200 includes a pipelined floating point execution architecture capable of operating on three vector operands, denoted A, B and C. For vector operations, four 32-bit word vectors are supported, with the words in each vector being denoted as X, Y, Z and W, and as such, each processing lane 218 receives three operand words, one from each vector. Thus, for example, for the processing lane 218 that processes the X word from each vector, the operands fed to that processing lane are denoted as AX, BX and CX.

Each processing lane 218 is configured to perform an operation in parallel with one or more other processing lanes. For example, each processing lane may multiply a pair of operands to perform a cross product or dot product operation. By multiplying different pairs of operands in different processing lanes of the vector unit, vector operations may be performed faster and more efficiently.

Each processing lane 218 is also pipelined to further improve performance. Accordingly, each processing lane 218 includes a plurality of pipeline stages for performing one or more operations on the operands. For example, for a first stage, each processing lane may include a multiplier 220 for multiplying the A and C operands. In one embodiment of the invention, the multiplication of operands may be performed in a first stage of the pipeline as illustrated in FIG. 5.

Each processing lane 218 may also include an aligner 222 for aligning operand B with the product computed by multiplier 220, in parallel with the computation of the product. While alignment is shown in the same pipeline stage in FIG. 5, one skilled in the art will recognize that the multiplication and alignment may be performed in separate pipeline stages in other embodiments.

Each processing lane 218 may also include an adder 224 for adding two or more operands. In one embodiment (illustrated in FIG. 5), each adder 224 is configured to receive the product computed by multiplier 220 (output as a sum and carry), and add the product to the aligned operand output by aligner 222. Therefore, each processing lane 218 may be configured to perform a multiply-add instruction. One skilled in the art will recognize that multiply-add instructions are frequently performed in vector operations. Therefore, by performing several multiply add instructions in parallel lanes, the efficiency of vector processing may be significantly improved.

Each vector processing lane 218 may also include a normalizing stage, and a rounding stage, as illustrated in FIG. 5. Accordingly, a normalizer 226 may be provided in each processing lane. Normalizer 226 may be configured to represent a computed value in a convenient exponential format. For example, normalizer 226 may receive the value 0.0000063 as a result of an operation. Normalizer 226 may convert the value into a more suitable exponential format, for example, $6.3 \times 10^{-6}$. The rounding stage may incorporate a rounder 228 that is capable of rounding a computed value to a desired number of decimal points. For example, a computed value of 10.5682349 may be rounded to 10.568 if only three decimal places are desired in the result. In one embodiment of the invention rounder 228 may round the least significant bits of the particular precision floating point number the rounder is designed to work with.

One skilled in the art will recognize that embodiments of the invention are not limited to the particular pipeline stages, components, and arrangement of components described above and in FIG. 5. For example, in some embodiments, aligner 222 may be configured to align operand B, a product computed by multiplier 220, or both. Furthermore, embodiments of the invention are not limited to the particular components described in FIG. 5. Any combination of the illustrated components and additional components such as, but not limited to, leading zero adders, dividers, etc. may be included in each processing lane 218 consistent with the invention.

In addition, it will be appreciated that data dependent conditional write instructions may be implemented in scalar execution units, as well as in fixed point and other execution units. The invention is therefore not limited solely to use in vector floating point execution units.

As noted above, conventional algorithms that incorporate conditional branches and/or predication to implement z-buffer test and like algorithms often do not have optimum performance due to either mispredict penalties or the introduction of dependencies. For example, in a processing unit having an architecture such as that described above in connection with FIG. 4, where a vector floating point unit is implemented as an AXU 166 that is decoupled from a fixed point unit 184 and branch unit 186, and where branch unit 186 is tightly coupled to fixed point unit 184 and utilizes a condition register that is local to the branch unit but remote from the AXU, the introduction of condition testing and conditional branches within a performance critical loop of floating point instructions may introduce a significant performance penalty in connection with mispredicts of the conditional branches. Likewise, the use of predication in such an implementation in order to avoid the use of a remote condition register still introduces dependencies between the setting of the predicate register and the conditional storage of data based upon the contents of that register.

In contrast, returning to FIG. 5, the illustrated embodiment utilizes a data dependent conditional write instruction that eliminates the need for either conditional branches or predication, and thus improves the performance of such conditional writes relative to conventional approaches. Data dependent conditional write instructions in the illustrated embodiment are processed in part by write enable generation logic 230 that uses data dependent information in the execution pipeline to control one or more write enable signals 232 in vector register file 210. Thus, in contrast to predication-based approaches where vector compares are used to set a mask register to be used by future instructions, data dependent conditional write instructions consistent with the invention use similar compare functionality in the vector floating point execution unit to generate write enable signals that control whether the target is written and updated, or if it remains unchanged.

In this embodiment, each vector word 216 and associated processing lane 218 is capable of generating an independent write enable signal 232 (designated as Word_x_we, Word_y_we, Word_z_we and Word_w_we) for words x, y, z and w, respectively, such that the update of a target register may be conditioned on a word-by-word basis, and such that only a subset of the words in a target register may end up being updated as a result of a data dependent conditional write instruction. In other embodiments, however, fewer write enable signals, e.g., one per vector, may be used to control the update of a target register. In the event that a single write enable signal is used, the update of each word is dependent on the test of the same data against the same condition, while the use of multiple write enable signals enables the updates of particular words to be conditioned on the test of different data and/or against different conditions.

Figure 6:
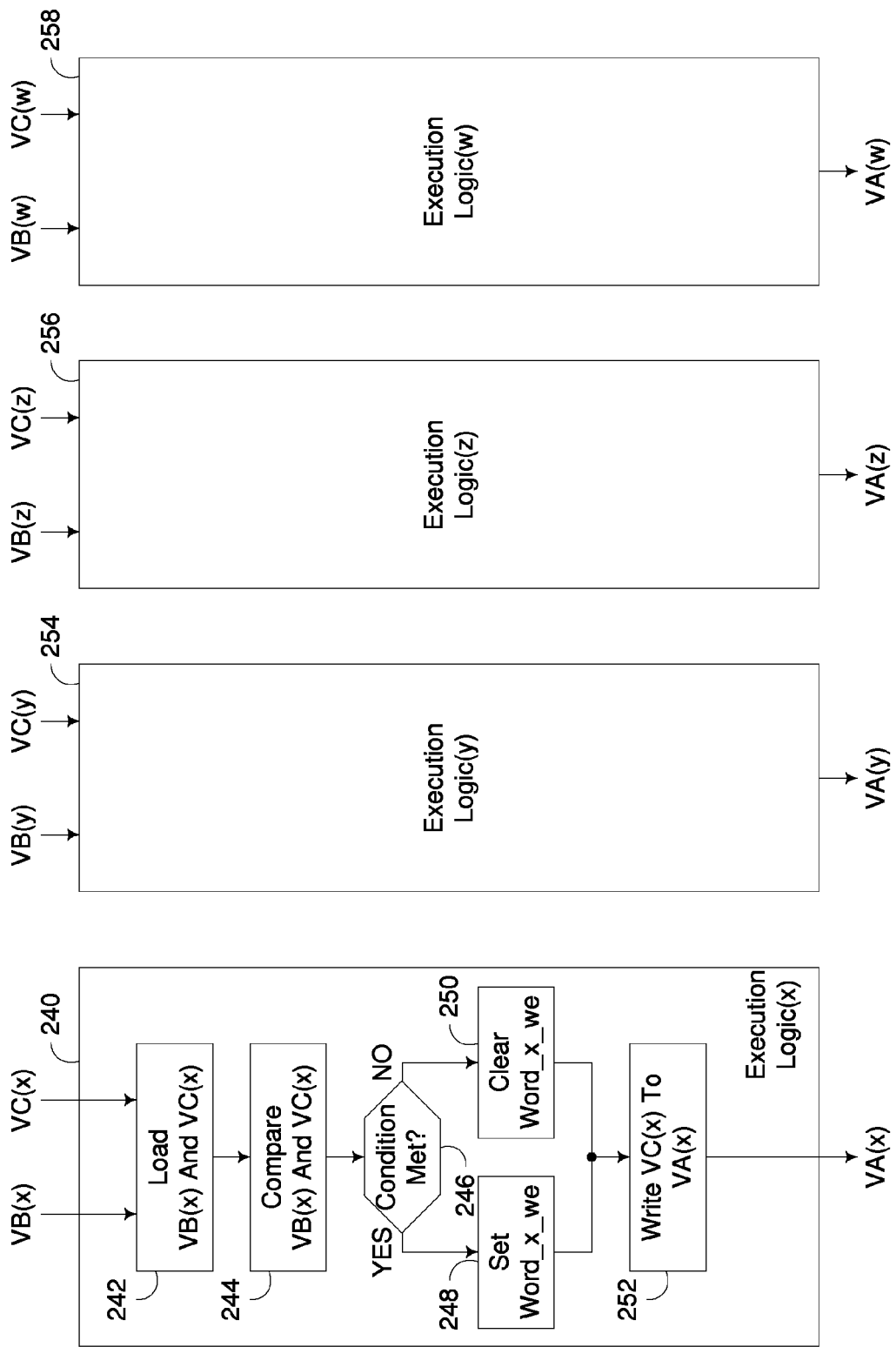
FIG. 6 is a block diagram of execution logic implemented in the processing unit of FIG. 5.

Now turning to FIG. 6, it will be assumed for the purposes of further describing the processing of data dependent conditional write instructions that at least one instruction capable of being processed by processing unit 200 constitutes a data dependent conditional write instruction that conditionally writes to a target register identified here as VA based upon a comparison of the contents of two other vector registers (identified here as vector registers VB and VC), such that the contents of vector register VC are written to vector register VA only if the condition is met.

To process such an instruction, execution logic 240, e.g., as may be implemented within the x-processing lane 218 of execution pipeline 212, loads the x words of registers VB and VC in block 242. A comparison (e.g., a VC(x)>VB(x) comparison) is then performed in block 244, and based upon whether this condition is met, block 246 passes control either to block 248 or 250. If the condition is met, the Word_x_we write enable signal is set or asserted by block 248, while if the condition is not met, the Word_x_we write enable signal is cleared or deasserted by block 250. Then, block 252 initiates a write to the x word of target register VA with the x word of register VC. Whether or not that write results in the x word of target register VA being updated is based upon whether the Word_x_we write enable signal is or is not asserted when the write is attempted. Thus, the target register will be updated as a result of the instruction only if the specified condition is met and the associated word write enable signal is set.

In the illustrated embodiment, execution logic 240 is disposed at least in part in the x-lane 218 of execution pipeline 212. In addition, similar execution logic 254, 256 and 258 may be disposed in the y, z and w-lanes 218 of the execution pipeline, and operate in a similar manner on the respective y, z and w words of registers VA, VB and VC. In addition, it should be noted that each processing lane is dependent upon a different comparison, so that all, none or only a subset of the words in the target register may be updated as a result of execution of the instruction. In another embodiment, however, the write enable signals may be controlled based upon the same condition.

In addition, in the illustrated embodiment, blocks 242-252 may be implemented in any number of pipeline stages, e.g., with block 242 being processed in a first stage, blocks 244-250 being implemented in a second stage, and block 252 being implemented in a third stage, such that the instruction may be executed in a total of three pipeline stages. In other embodiments, however, different numbers of stages may be used to execute a data dependent conditional write instruction.

It will also be appreciated that other conditions may be tested by execution logic 240 for different types of data dependent conditional write instructions, which may include other comparisons as well as conditions other than comparisons, such as exception conditions. As a result, the number of inputs to the execution logic, as well as the types of conditions that are tested, may vary in different embodiments.

Figure 7:
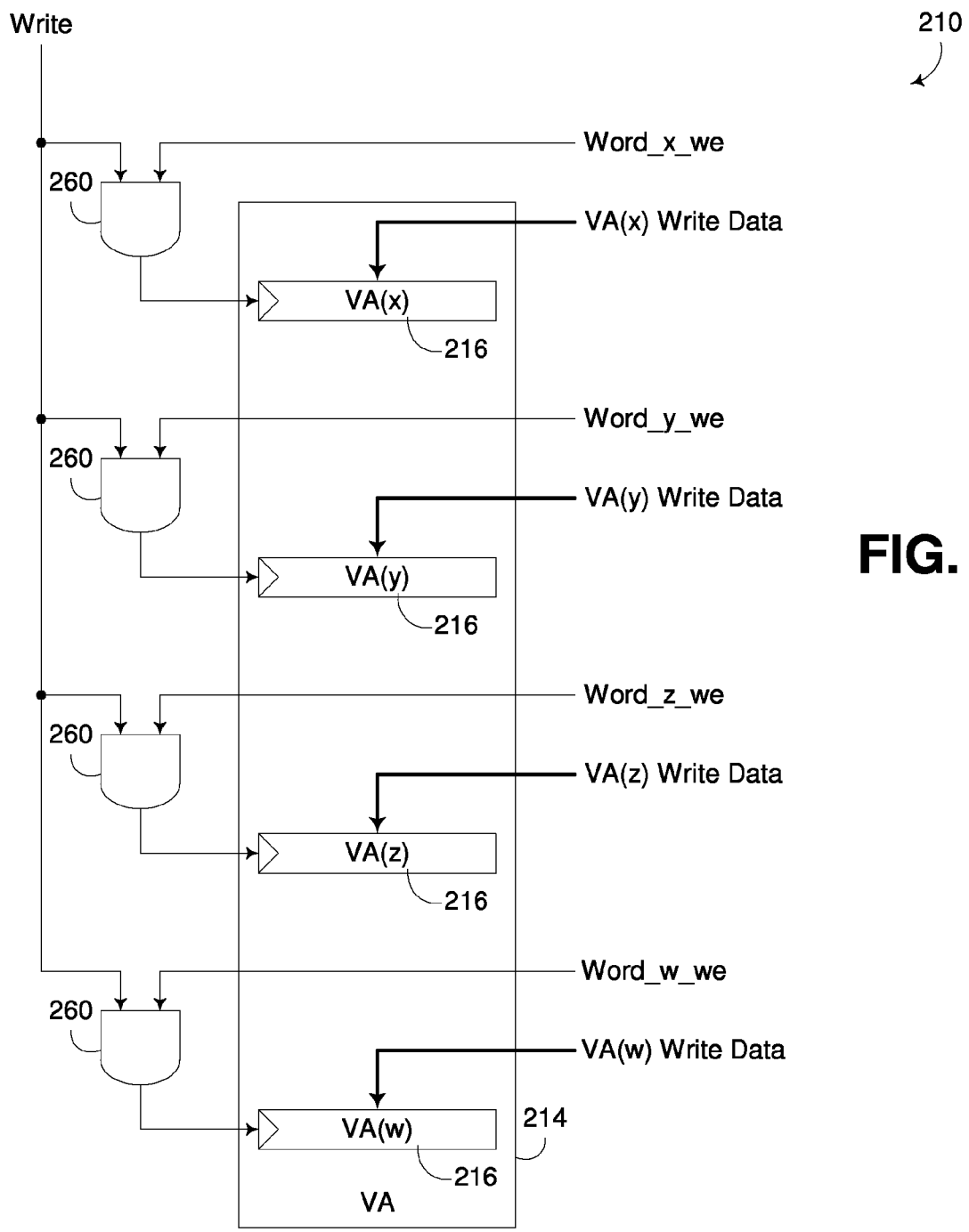
FIG. 7 is a block diagram of write enable logic implemented in the register file referenced in FIG. 5.

FIG. 7 next illustrates one exemplary implementation of a portion of the write enable logic that may be implemented in register file 210. In particular, FIG. 7 illustrates a target register VA 214 with individual storage elements 216 for words x, y, z and w, and which are capable of receiving write data VA(x), VA(y), VA(z) and VA(w) respectively. Latching of the write data into storage elements 216 is initiated in response to a write signal asserted by execution pipeline 212 (e.g., during block 252 of FIG. 6). However, in contrast with conventional register file architectures, register file 210 may include a set of AND gates 260 that selectively mask the write signal based upon the corresponding word write enable signals. With the word write enable signal asserted high when the write signal is asserted, the corresponding AND gate 260 passes the write signal to the corresponding word storage element 216, resulting in the corresponding write data being latched into the storage element. With the word write enable signal cleared, however, the write signal is masked by AND gate 260, and the corresponding storage element 216 is not updated with the write data.

It will be appreciated that a number of different logic arrangements may be used in lieu of that disclosed in FIG. 7 to implement the selective enabling or disabling of writes to target registers in register file 210 in other embodiments of the invention. The invention is therefore not limited to the particular configuration disclosed in FIG. 7.

To further illustrate the operation of the illustrated embodiment of the invention, a particular implementation of a data dependent conditional write instruction suitable for use in a z-buffer test algorithm is discussed in further detail herein. With this instruction available, applications that rely on performance critical z-buffer testing may be able to take advantage of less dependent operations to speed up tight loops, as well as take advantage of not using as many temporary registers to do the same basic function.

This particular data dependent condition write instruction, referred to herein as "vztest," may be implemented, for example, as a PowerPC VMX-type instruction having an opcode that identifies the instruction as a data dependent conditional write instruction, and supporting three operands. The first operand identifies a target register, the second operand identifies a first register that stores the data for a current pixel stored in the z-buffer for a given coordinate, and the third operand identifies a second register that stores the data for a new pixel at that coordinate for which it is desired to update the z-buffer if that new pixel is closer to the camera than the current pixel, and thus is not occluded by the current pixel. For this instruction, it is assumed that the condition being tested is whether the z-value (or depth) of the new pixel is greater than the z-value (or depth) of the current pixel stored in the z-buffer. Thus, if the z-value of the new pixel is greater than that of the current pixel, the data for the new pixel overwrites the data for the current pixel at the given coordinates. Otherwise, the data for the current pixel is retained, and no update is performed as a result of the data dependent conditional write instruction.

The use of such the herein-described vztest instruction in a z-buffer test algorithm is illustrated in greater detail below in Table III, which presents program code suitable for implementing a z-buffer test iteration in a PowerPC VMX-type instruction set augmented with a data dependent conditional write instruction consistent with the invention:

TABLE III

Z-Buffer PowerPC Assembly Code

```
lvx     vr1,ra,rb     #Load previous_zval_for_pixel(x,y) into vr1
vztest  vr1,vr1,vr0   #compare Z's in lane2, setting write enable
                       if new>old
```

In this program code, the lvx load instruction loads vector register vr1 with the previous z-value for the current pixel for a given (x,y) coordinate in the image. It is assumed that the z-value for the new pixel at that location is stored in vector register vr0. The vztest instruction therefore receives as operands vr1 as both the target register and the register storing the current data in the z-buffer, and vr0 as the register storing the data for the new pixel. As a result of the execution of the vztest instruction, data associated with the instruction, here the z-values for the current and new pixels, respectively stored in identified registers vr1 and vr0, are tested against a condition associated with the instruction, here a greater than comparison between vr0 and vr1. If the condition is met, and the z-value stored in vr0 is greater than the z-value stored in vr1, a write to the target register (here vr1) is enabled, such that when a write is initiated in response to the instruction, the target register vr1 will be updated with the contents of vr0, thus updating the z-buffer with the data for the new pixel. If, on the other hand, the condition is not met, a write to the target register vr1 will be disabled, such that when a write is initiated in response to the instruction, the target register vr1 will not be updated with the contents of vr0, thus leaving the contents of vr1 unchanged as a result of the execution of the instruction.

In this embodiment, only the z word of register vr0 is written to the z word of register vr1 whenever the comparison is true, and the comparison is only based upon a comparison of the z words of registers vr0 and vr1. In other embodiments, z values from multiple adjacent pixels may be collected into the same vector, e.g., using permutation or swizzling, so that a z-buffer test could be performed concurrently for multiple pixels, with only those pixels having a greater depth being updated in the z-buffer using independent word write enable signals.

It will be appreciated that the combination of a simple load instruction and a vztest data dependent conditional write instruction enables z-buffer test iterations to be performed in fewer cycles than with other approaches. Assuming a six cycle deep pipeline, for example, an iteration would take a total of 12 cycles, as compared to a conditional branch approach where a correct prediction would still require 18 cycles, and any mispredict would introduce additional performance penalties of 20-30 cycles or more as a result of the need to flush the pipeline. Likewise, with a predication-based approach, each iteration would typically take 18 cycles, and additionally consume an additional temporary register for use as the predicate register.

Various modifications may be made to the illustrated embodiments without departing from the spirit and scope of the invention. For example, as mentioned above, other conditions and comparisons may be used to condition a write consistent with the invention. In addition, data dependent conditional write instructions may be utilized with vector or scalar execution units, as well as different types of execution units such as floating point units, fixed point units, etc., and when used in connection with a vector execution unit, selective writes to targets may be based upon vector-wide comparisons and/or word-specific comparisons and/or may selectively disable or enable writes on a vector-wide or word-specific basis. Furthermore, in some embodiments, the functionality of a data dependent conditional write instruction may be partitioned among multiple instructions, e.g., so that the functionality for the testing of a condition, the selectively enabling or disabling of writes, and the initiation of writes while writes are selectively disabled or enabled may be split among multiple instructions. Additional modifications may be made as will be appreciated by one of ordinary skill in the art. The invention therefore lies in the claims hereinafter appended.

What is claimed is:

1. A method of executing an instruction in an execution unit, the method comprising, in response to receiving a data dependent conditional write instruction:
    testing data associated with the data dependent conditional write instruction against a condition associated with the data dependent conditional write instruction; and
    selectively writing to a target associated with the data dependent conditional write instruction based upon the test;
    wherein testing the data against the condition includes determining that the condition is not met, and wherein selectively writing to the target comprises, in response to determining the condition is not met:
    in a first stage of a multi-stage execution pipeline in the execution unit that is executing the data dependent conditional write instruction, deasserting a write enable signal based upon the determination that the condition is not met; and
    in a second, subsequent stage of the multi-stage execution pipeline, writing to the target while the write enable signal is not asserted such that the target is not updated in response to the write;
    wherein the data dependent conditional write instruction includes an operand that identifies the data against which the condition is tested, wherein testing the data against the condition includes testing the data identified by the operand, wherein the operand is a first operand that identifies a first register, wherein the data dependent conditional write instruction includes a second operand that identifies a second register, and wherein testing the data against the condition includes comparing data stored in the first register with data stored in the second register.

2. The method of claim 1, wherein the data dependent conditional write instruction includes an operand that identifies a target register, wherein selectively writing to the target associated with the data dependent conditional write instruction comprises selectively writing to the target register.

3. The method of claim 2, wherein the execution unit includes a register file that includes a plurality of registers and write enable logic coupled to the register file, wherein the target register is selected from among the plurality of registers, and wherein the write enable logic is configured to selectively enable a write to the target register in response to a write enable signal.

4. The method of claim 3, wherein selectively writing to the target comprises:
    selectively asserting the write enable signal;
    writing to the target register while the write enable signal is selectively asserted such that the target register is updated only if the write enable is asserted, wherein writing to the target register includes asserting a write signal; and
    gating the write signal with the write enable signal using an AND gate coupled to receive the write signal and the write enable signal as inputs thereto.

5. The method of claim 3, wherein the execution unit comprises a vector execution unit, wherein the register file comprises a vector register file that includes a plurality of vector registers, wherein each vector register includes a plurality of words, wherein the write enable signal includes a plurality of word write enable signals, each of which corresponding to a word from among the plurality of words, wherein the write enable logic is responsive to the plurality of word write enable signals to selectively enable a write to selected words from the target register, wherein selectively asserting the write enable signal includes asserting only a subset of the plurality of word write enable signals, wherein writing to the target register while the write enable signal is selectively asserted includes updating only those words from among the plurality of words in the target register for which the corresponding word write enable signal is asserted.

6. The method of claim 1, wherein the first and second registers are general purpose registers disposed in an architected register file.

7. The method of claim 1, wherein the condition includes at least one of a less than compare, a greater than compare, a less than or equal to compare, a greater than or equal to compare, an equal to compare, a not equal to, a boundary compare, and a not-a-number compare.

8. The method of claim 1, wherein the condition includes an exception selected from the group consisting of an overflow exception, an underflow exception, an inexact exception, and combinations thereof.

9. The method of claim 1, wherein the execution unit is a floating point unit.

10. The method of claim 9, wherein the processing unit includes a branch unit, condition register and a fixed point unit from which the floating point unit is decoupled, wherein the branch unit includes branch prediction logic, and wherein testing the data associated with the data dependent conditional write instruction against the condition associated with the data dependent conditional write instruction is performed without accessing the condition register.

11. The method of claim 1, further comprising executing a z-buffer test routine for a plurality of pixels in an image, wherein the data dependent conditional write instruction identifies a target register, wherein the first register stores a new depth associated with a new pixel to be written at a first coordinate, wherein executing the z-buffer test routine includes, in response to receiving a load instruction prior to receiving the data dependent conditional write instruction, loading an existing depth for the first coordinate into the second register, wherein testing the data associated with the data dependent conditional write instruction against the condition associated with the data dependent conditional write instruction includes performing a greater than comparison between the first and second registers, and wherein selectively writing to the target associated with the data dependent conditional write instruction based upon the test includes writing data from the first register to the target register only if the new depth stored in the first register is greater than the existing depth stored in the second register.

12. A method of conditionally writing to a target in a processing unit of the type including an execution unit with a register file, the method comprising:
    testing whether a condition is met;
    selectively enabling or disabling a write to a target in the register file based upon whether the condition is met; and
    initiating a write to the target while the write is selectively enabled or disabled based upon whether the condition is met such that the target is updated in response to initiating the write only if the write is selectively enabled,
    wherein testing whether the condition is met, selectively enabling or disabling the write to the target and initiating the write to the target are performed in response to receiving a data dependent conditional write instruction, wherein testing whether the condition is met includes testing data associated with the data dependent conditional write instruction against a condition associated with the data dependent conditional write instruction, wherein testing the data against the condition includes determining that the condition is not met, and wherein initiating the write to the target includes, in response to determining the condition is not met:

in a first stage of a multi-stage execution pipeline in the execution unit that is executing the data dependent conditional write instruction, deasserting a write enable signal based upon the determination that the condition is not met; and in a second, subsequent stage of the multi-stage execution pipeline, writing to the target while the write enable signal is deasserted such that the target is not updated in response to the write;

wherein the data dependent conditional write instruction includes an operand that identifies the data against which the condition is tested, wherein testing the data against the condition includes testing the data identified by the operand, wherein the operand is a first operand that identifies a first register, wherein the data dependent conditional write instruction includes a second operand that identifies a second register, and wherein testing the data against the condition includes comparing data stored in the first register with data stored in the second register.

13. The method of claim 12, wherein the first and second registers are general purpose registers disposed in an architected register file.

14. The method of claim 12, further comprising executing a z-buffer test routine for a plurality of pixels in an image, wherein the data dependent conditional write instruction identifies a target register, wherein the first register stores a new depth associated with a new pixel to be written at a first coordinate, wherein executing the z-buffer test routine includes, in response to receiving a load instruction prior to receiving the data dependent conditional write instruction, loading an existing depth for the first coordinate into the second register, wherein testing the data against the condition includes performing a greater than comparison between the first and second registers, and wherein initiating the write includes writing data from the first register to the target register only if the new depth stored in the first register is greater than the existing depth stored in the second register.

15. A circuit arrangement, comprising:

a register file including a plurality of registers; and an execution unit coupled to the register file and configured to, in response to a data dependent conditional write instruction, test data associated with the data dependent conditional write instruction against a condition associated with the data dependent conditional write instruction, and selectively write to a target associated with the data dependent conditional write instruction based upon the test, wherein the execution unit is configured to test the data against the condition by determining that the condition is not met, and selectively write to the target by, in response to determining the condition is not met:

in a first stage of a multi-stage execution pipeline in the execution unit that is executing the data dependent conditional write instruction, deasserting a write enable signal based upon the determination that the condition is not met; and in a second, subsequent stage of the multi-stage execution pipeline, writing to the target while the write enable signal is not asserted such that the target is not updated in response to the write;

wherein the data dependent conditional write instruction includes an operand that identifies the data against which the condition is tested, wherein testing the data against the condition includes testing the data identified by the operand, wherein the operand is a first operand that identifies a first register, wherein the data dependent conditional write instruction includes a second operand that identifies a second register, and wherein testing the data against the condition includes comparing data stored in the first register with data stored in the second register.

16. The circuit arrangement of claim 15, wherein the execution unit is a vector floating point unit, and wherein the register file comprises a vector register file that includes a plurality of vector registers, wherein the circuit arrangement further comprises a branch unit, a condition register and a fixed point unit from which the vector floating point unit is decoupled, wherein the branch unit includes branch prediction logic, and wherein the execution unit is configured to test the data associated with the data dependent conditional write instruction against the condition associated with the data dependent conditional write instruction without accessing the condition register.

17. The circuit arrangement of claim 15, wherein the execution unit is configured to execute a z-buffer test routine for a plurality of pixels in an image, wherein the data dependent conditional write instruction identifies a target register, wherein the first register stores a new depth associated with a new pixel to be written at a first coordinate, wherein the execution unit is configured to execute the z-buffer test routine by, in response to a load instruction received prior to the data dependent conditional write instruction, loading an existing depth for the first coordinate into the second register, wherein the execution unit is configured to test the data associated with the data dependent conditional write instruction against the condition associated with the data dependent conditional write instruction by performing a greater than comparison between the first and second registers, and wherein the execution unit is configured to selectively write to the target associated with the data dependent conditional write instruction based upon the test by writing data from the first register to the target register only if the new depth stored in the first register is greater than the existing depth stored in the second register.

18. An integrated circuit device including the circuit arrangement of claim 15.

19. A program product comprising a non-transitory computer readable medium and logic definition program code resident on the computer readable medium and defining the circuit arrangement of claim 15.

20. A circuit arrangement, comprising:

a register file including a plurality of registers; and an execution unit coupled to the register file and configured to conditionally write to a target in the register file by testing whether a condition is met, selectively enabling or disabling a write to the target in the register file based upon whether the condition is met, and initiating a write to the target while the write is selectively enabled or disabled based upon whether the condition is met such that the target is updated in response to initiating the write only if the write is selective enabled, and wherein the execution unit attempts to write to the target regardless of whether the write is selectively enabled or disabled such that the target is not updated in response to attempting the write while the write is selectively disabled, and wherein the execution unit includes a multi-stage execution pipeline configured to execute a data dependent conditional write instruction, the multi-stage execution pipeline including a first stage configured to deassert a write enable signal based upon a determination that the condition is not met, and a second, subsequent stage configured to write to the target while the write enable signal is not asserted such that the target is not updated in response to the write;
wherein the data dependent conditional write instruction includes an operand that identifies the data against which the condition is tested, wherein testing the data against the condition includes testing the data identified by the operand, wherein the operand is a first operand that identifies a first register, wherein the data dependent conditional write instruction includes a second operand that identifies a second register, and wherein testing the data against the condition includes comparing data stored in the first register with data stored in the second register.

* * * * *